United States Patent [19]

Ettel et al.

[11] 4,119,539
[45] Oct. 10, 1978

[54] THREE PHASE SEPARATION

[75] Inventors: Victor Alexander Ettel; Juraj Babjak, both of Mississauga, Canada

[73] Assignee: The International Nickel Company, Inc., New York, N.Y.

[21] Appl. No.: 806,753

[22] Filed: Jun. 15, 1977

[30] Foreign Application Priority Data

Nov. 15, 1976 [CA] Canada ............................ 265643

[51] Int. Cl.² .............................................. B01D 21/14
[52] U.S. Cl. ...................................... 210/73 R; 210/83; 210/319; 210/537
[58] Field of Search ............... 210/532 R, 537, 23, 210/319, 83, 84, 523, 524, 528, 73 R; 423/142

[56] References Cited

U.S. PATENT DOCUMENTS

| 304,687 | 9/1884 | Ams | 210/537 |
|---|---|---|---|
| 2,125,722 | 8/1938 | Hawkins | 210/51 |
| 2,678,912 | 5/1954 | Kalinske et al. | 210/3 |
| 2,881,920 | 4/1959 | Simkin | 210/114 |
| 3,174,927 | 3/1965 | Cross et al. | 210/24 |
| 3,479,378 | 11/1969 | Orlandini et al. | 260/429 |

FOREIGN PATENT DOCUMENTS 2,636,372  3/1977  Fed. Rep. of Germany ............ 210/532

Primary Examiner—Thomas G. Wyse
Assistant Examiner—David R. Sadowski
Attorney, Agent, or Firm—Lewis Messulam; Ewan C. MacQueen

[57] ABSTRACT

A three phase mixture, of organic liquid, aqueous liquid and solid phases, is separated in a settler vessel equipped with means for imparting local agitation in the region of the aqueous/organic interface.

7 Claims, 1 Drawing Figure

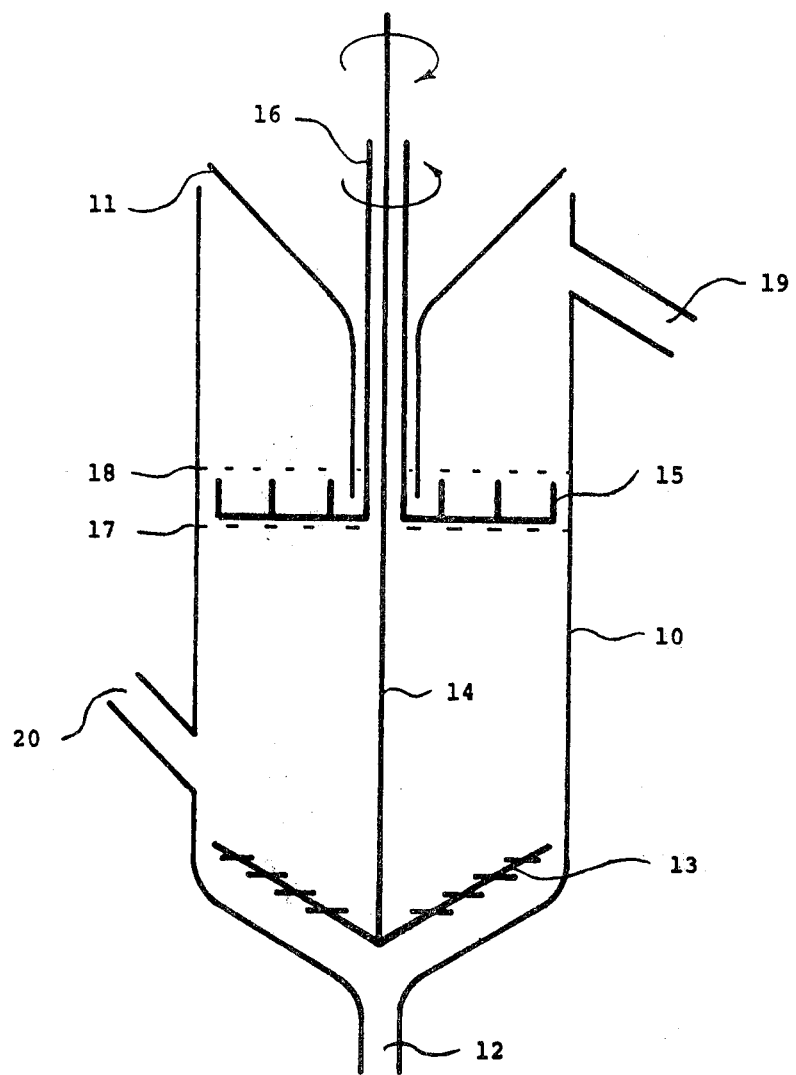

THREE PHASE SEPARATION

The present invention relates to a process for separating a three-phase mixture consisting of an aqueous phase, a liquid organic phase and a solid phase. It is particularly, though not exclusively, applicable to the treatment of a mixture wherein the solid comprises mainly gypsum, such as may be obtained in the course of recovering a metal by a solvent extraction or an ion exchange technique.

In many known processes for liquid-liquid extraction of a metal from an aqueous solution thereof with the aid of an organic extractant, the efficiency of extraction and more particularly the selectivity thereof are often dependent on the prevailing pH in the mixture. Where, as is common, the extraction is accompanied by a release of hydrogen ions, efficient operation requires neutralization in situ of the liberated hydrogen ions. Neutralizing agents such as sodium bases and ammonia, which are themselves water soluble and lead to water soluble neutralization products, are usually recommended for this application. In many instances however the use of sodium bases may be too expensive while the use of ammonia may be environmentally unacceptable. Despite their cheapness and their environmental acceptability, calcium bases have not until recently been advocated for in situ neutralization during solvent extraction due to their own limited solubility as well as the generation of gypsum if, as is most common, sulfate ions are present. The reluctance to resort to calcium bases stemmed probably from a combination of the apprehension of detrimental effects of solids on the solvent extraction process, and the apprehension of difficulties in dealing with the resulting three-phase mixture. In a recent Canadian patent application, Ser. No. 225,719, filed Apr. 29, 1975 and assigned in common with the present invention, the practicability of efficiently extracting metals in the presence of a calcium base and gypsum was demonstrated. However the treatment of the organic-aqueous-solid dispersion resulting from such a use has until now remained as the main obstacle to commercial implementation of such a process.

Where, as is common, the dispersion resulting from a solvent extraction process is solid-free, separation of the phases involves feeding the dispersion into a settler consisting of a vessel with upper and lower apertures for withdrawal of the separate phases. However where a gypsum containing dispersion is involved, attempts to use a conventional settler result in a tendency to build up an emulsion of the three phases, commonly referred to as "crud" at the interface of the organic and the aqueous settled phases. The tendency for this layer of crud to build up appears to be particularly marked when the pH of the dispersion is high, and as a result the phase separation may be brought to a halt by the settler becoming flooded with the crud. Even prior to this point of flooding being reached, the presence of the crud layer at the interface is detrimental to the efficiency of phase separation in that it results in excessive entrainment of organic in the aqueous phase and of crud in the organic phase.

It is an object of the present invention to provide a process whereby a mixture of an organic liquid, an aqueous liquid and a solid may be efficiently separated into its component phases.

It is a further object of the invention to provide apparatus for carrying out such a separation process.

Accordingly, the present invention provides a process for separating a three-phase mixture of an aqueous liquid, an organic liquid less dense than the aqueous liquid and a solid denser than the aqueous liquid comprising introducing the mixture into a settler wherein the solid and the aqueous liquid settle below the organic liquid to define an organic/aqueous interface, withdrawing the organic liquid from above the interface, withdrawing the aqueous liquid and the solid from below the interface, and imparting a local agitation to the liquids at the interface level during the separating process.

The term "local agitation" is used herein to signify agitation of materials present in only a predetermined portion of the settler. Such agitation may be produced, for example, by introducing a stream of air or other sparging gas at the level of the aqueous/organic interface. With such a procedure, the localized zone of agitation is not restricted to the interfacial region, but inevitably includes the supernatant column of organic liquid. It is preferred however to impart a more localized agitation, restricted to a disc-shaped region within of the settler, separating the aqueous and organic liquids. This is achieved by relying on mechanical stirring means which may comprise a single stirring blade, or more preferably a pair or counter rotating blades or a combination of a rotating blade and a stationary baffle.

Whatever the means relied on for agitation, the process is controlled, preferably by use of automatic level sensors within the settler, to ensure that the rate at which mixture is introduced into the settler and the rates at which liquids and solid are removed therefrom are so correlated that the liquid-liquid interface is maintained substantially at the level at which the local agitation is imparted.

According to one aspect of the invention, the separation process is carried out by first introducing the mixture to be separated into a primary vessel, equipped with interfacial stirring means from which vessel are withdrawn a first stream consisting essentially of organic liquid and a second stream consisting of a slurry of solid in the aqueous liquid. The aqueous slurry is subsequently introduced into a secondary vessel which may consist of a conventional solid-liquid settler, i.e. a vessel having a tapered bottom and a rake close to the bottom, whereby a thickened slurry of the solid may be obtained as well as a substantially solid-free aqueous liquid. Moreover if desired the organic stream obtained from the primary settler vessel may be fed into a further secondary vessel to separate any entrained aqueous liquid or solid phase from the bulk of the organic phase.

In a preferred embodiment of the invention however a novel apparatus is resorted to wherein both the primary and secondary settling operations take place simultaneously. The apparatus in question consists of a settler vessel having an inlet aperture through which the three-phased dispersion is introduced and three outlet apertures through which are withdrawn respectively organic liquid, aqueous liquid, and a slurry of solid in aqueous liquid. The exit apertures through which the liquids are withdrawn are located at vertically spaced positions in the side wall of the vessel, and a mechanical stirrer is mounted to provide agitation at a level between these two side apertures. The slurry exit aperture is located at the bottom of the vessel, the bottom being appropriately sloped to facilitate exit of the slurry and a mechanical stirrer is mounted close to the bottom to rake the settled solids. In general a higher speed of rotation will be required for the stirrer at the interface than for the stirrer used for raking the solids. While this may be provided for by the use of suitable gearing to drive both stirrers from a single motor, it is preferred to provide for independent rotation of the two stirrers.

The invention will now be particularly described with reference to a preferred embodiment as illustrated in the accompanying drawing.

BRIEF DESCRIPTION OF THE DRAWING

The drawing illustrates schematically a novel settler vessel which can be used for carrying out the process of the invention.

DETAILED DESCRIPTION

An organic phase for solvent extraction tests was prepared by mixing one part by volume of a commercial extractant consisting of a 50% by volume kerosene solution of 2-hydroxy-benzophenoxime active anti-isomers, with nine parts by volume of a commercial solvent consisting of, by weight, 44% paraffins, 37% naphthenes and 19% aromatics.

This organic phase was used to extract nickel by mixing it in a continuous manner with an aqueous sulfate solution containing 5 grams per liter (g/l) of nickel. The aqueous and organic phase mixture, while being agitated, was treated with a lime slurry in such amounts as to maintain the pH of the mixture at about 6.0.

For the purpose of comparison several batches of the three-phase mixture resulting from the above extraction test were treated in a conventional separatory funnel in an attempt to obtain an organic liquid and an aqueous slurry. Analysis of the slurry and the crud formed at the interface showed that an amount of organic extractant corresponding to between 0.054 and 0.123 kg per kg of extracted nickel had been entrapped.

By contrast separation of the same three-phase mixture was carried out in the apparatus illustrated in the accompanying drawing. This apparatus consists of a generally cylindrical vessel 10 open at the top and equipped with a funnel 11 through which the dispersion is fed in. The bottom of the vessel is generally conical in shape and terminates at an exit aperture 12 through which a thick slurry of solid in aqueous phase is withdrawn from the vessel. To aid in settling and withdrawal of the slurry, a rake 13 is provided which is mounted on a shaft 14 and is so shaped and positioned as to agitate the slurry near the conical bottom of the settler. An interfacial stirrer 15 is mounted on a hollow shaft 16 and is positioned within the vessel so as to enable agitation of any liquid contained in the space between the levels indicated by the dotted lines 17 and 18. A side aperture 19 in the upper portion of the wall of the vessel enables organic liquid which has settled in the space above the level 18 to be withdrawn from the vessel, while a side aperture 20 in the lower part of the vessel wall enables aqueous phase to be withdrawn from below the level 17. The inlet funnel 11 is designed to terminate at a point in the vicinity of the interfacial stirrer 15.

The apparatus illustrated was used in the following manner. The dispersion of nickel-loaded organic liquid, depleted aqueous sulfate and gypsum prepared as described above was fed into the settler through the funnel 11 at a rate corresponding to 1.5 $m^3/h/m^2$ of settler cross-sectional area. Settled liquids were withdrawn from side apertures 19 and 20 while slurry was withdrawn from the bottom aperture 12, the flow rates being so controlled that the aqueous/organic interface was kept in the region between the levels 17 and 18, while the clear aqueous/slurry interface was kept in the region between the top of the rake 13 and the side aperture 20.

The shaft 14 was slowly rotated (tip speed of 40 m/h) during the test, while the shaft 16 was rotated, in the opposite sense to shaft 14, at a slightly higher speed (tip speed of 300 m/h). As a result of such an operation it was found that the presence of crud at the interface was virtually eliminated. The organic liquid extracted from side aperture 19 was found to be virtually free of solids, while analysis of the slurry tapped from the aperture 12 showed that the amount of organic extractant entrapped was only about 0.005-0.007 kg/kg of nickel extracted.

To demonstrate the importance of interfacial stirring, a separation was attempted in this same apparatus, except that the interfacial stirrer 15 was not rotated. It was found that a layer of crud soon built up at the interface, and after 2 hours this crud had spread throughout the upper portion of the vessel and had begun to overflow out of the exit aperture 19.

To illustrate the separation of other three-phased dispersions, a further solvent extraction test was carried out. The same organic phase as used in the previously described nickel extraction tests was in the present case mixed with a copper sulfate solution containing 5 g/l of copper, and extraction was carried out in a continuous manner at pH 3, with a lime slurry being used for pH control. By feeding the resulting three-phased dispersion into the illustrated apparatus, with both the rake 13 and the interfacial stirrer 15 being rotated at appropriate speeds, a satisfactory separation was effected. As in the case of the nickel-containing dispersion, it was found that crud at the interface was virtually eliminated and an organic phase was obtained which was essentially solid-free. The solid/aqueous slurry obtained was found to have entrapped therein only 0.0024 kg of organic extractant per kg of extracted copper.

It will be clear from the above results that the use of interfacial stirring in accordance with the process of the invention enables efficient separation to be obtained. Of course, in practise, it may be desired to further purify the organic liquid separated by the process of the invention or to treat the gypsum slurry obtained to remove any small amounts of organic extracted entrapped therein, and such further purification may be carried out by resorting to secondary vessels of conventional design without departing from the scope of the present invention.

In designing an apparatus for carrying out the process of the invention in a single vessel, it will be understood that the illustration in the accompanying drawings is merely schematic. Thus the vessel in question need not be cylindrical in shape but may have any convenient shape to accommodate the relative amounts of organic and aqueous phases present in the dispersion to be treated. Moreover the point at which the dispersion is fed into the vessel need not be in the vicinity of the interfacial region, but may as desired be above or below that region.

It will also be understood that the use of a single vessel to carry out the separation is not essential; a series of vessels can be used providing the first of these contains an interfacial stirrer. Thus various modifications may be made to the described embodiments without departing from the scope of the invention which is defined by the appended claims.

We claim:

1. A process for separating a three-phase mixture of an aqueous liquid, an organic liquid less dense than the aqueous liquid and a solid denser than the aqueous liquid comprising introducing the mixture into a settler wherein the solid and the aqueous liquid settle below the organic liquid to define an organic/aqueous interface, withdrawing the organic liquid from above the interface, withdrawing the aqueous liquid and the solid from below the interface, and imparting a local agitation to the liquids at the interface level during the separation process.

2. A process as claimed in claim 1 wherein the agitation is imparted by mechanical stirring means.

3. A process as claimed in claim 1 wherein the solid and the aqueous liquid are withdrawn from the settler together, the process further including introducing the withdrawn solid and aqueous liquid into a secondary settler wherein the solid and a portion of the aqueous liquid are separated from the remainder of the aqueous liquid and any traces of organic phase entrained therein.

4. A process as claimed in claim 1 further comprising imparting a secondary local agitation in the settler at a level near the bottom of the settler, withdrawing a slurry of the solid in a portion of the aqueous liquid from below the secondary agitation level, and withdrawing the remainder of the aqueous liquid from above the secondary agitation level.

5. A process as claimed in claim 4 wherein the settler comprises a vessel having a feed aperture for introducing the mixture thereinto, upper and lower side apertures, vertically spaced apart, for withdrawing liquids therefrom, a bottom aperture for withdrawing the slurry, interfacial agitator means mounted at a level between the upper and lower side apertures, and secondary agitator means mounted at a level between the lower side aperture and the bottom aperture.

6. A process as claimed in claim 5 wherein the secondary agitator means is operable independently of the interfacial agitator means.

7. A process as claimed in claim 5 wherein each of the interfacial agitator means and secondary agitator means comprises mechanical stirring means.

* * * * *